Nov. 3, 1942.  F. G. NESBITT  2,300,432
ALTIMETER CONTROL DEVICE
Filed Aug. 15, 1938  4 Sheets-Sheet 1
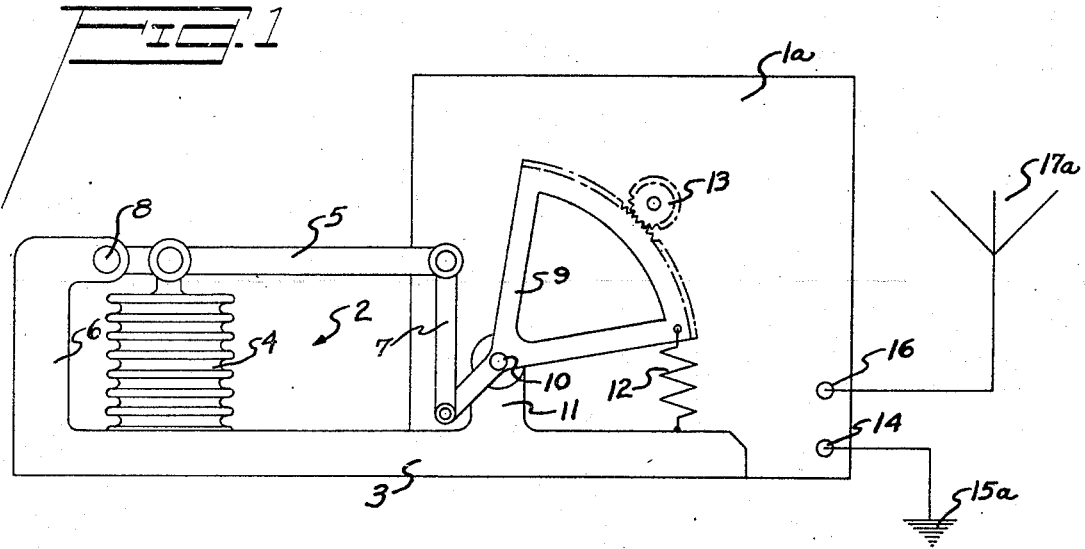
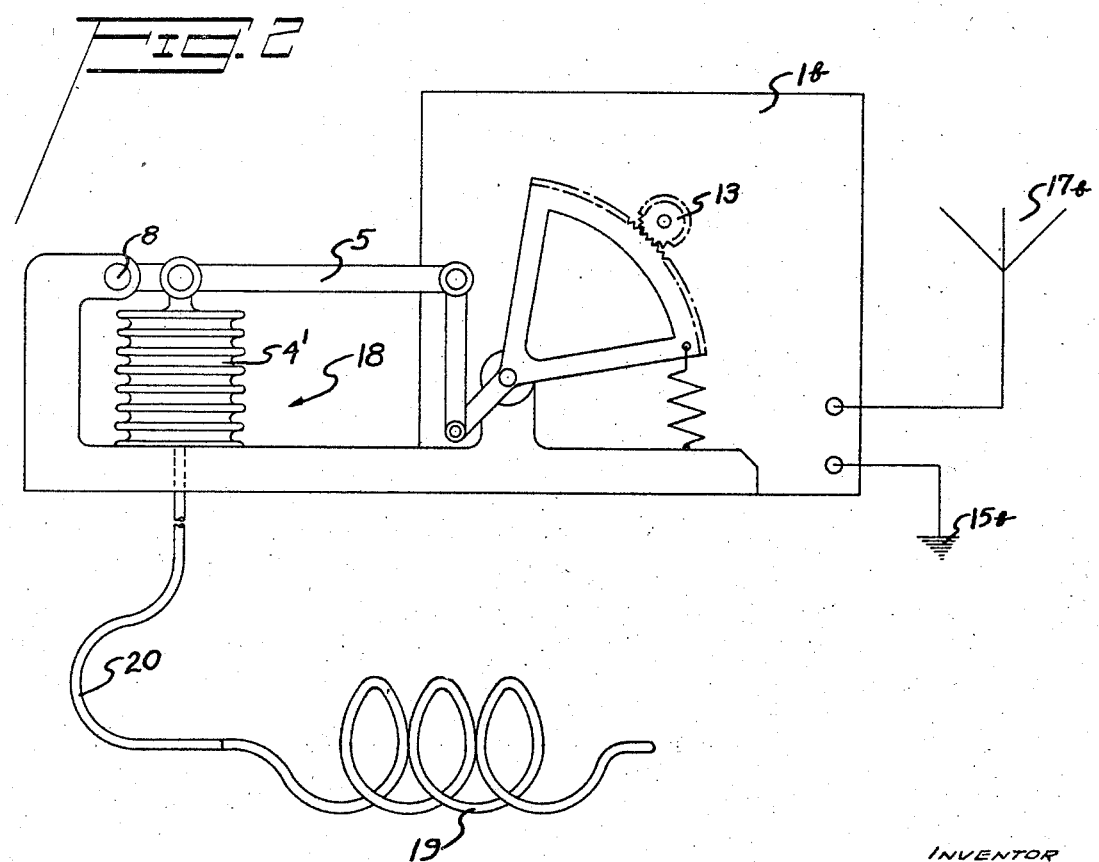
INVENTOR
FRANCIS GLEN NESBITT
ATTORNEYS

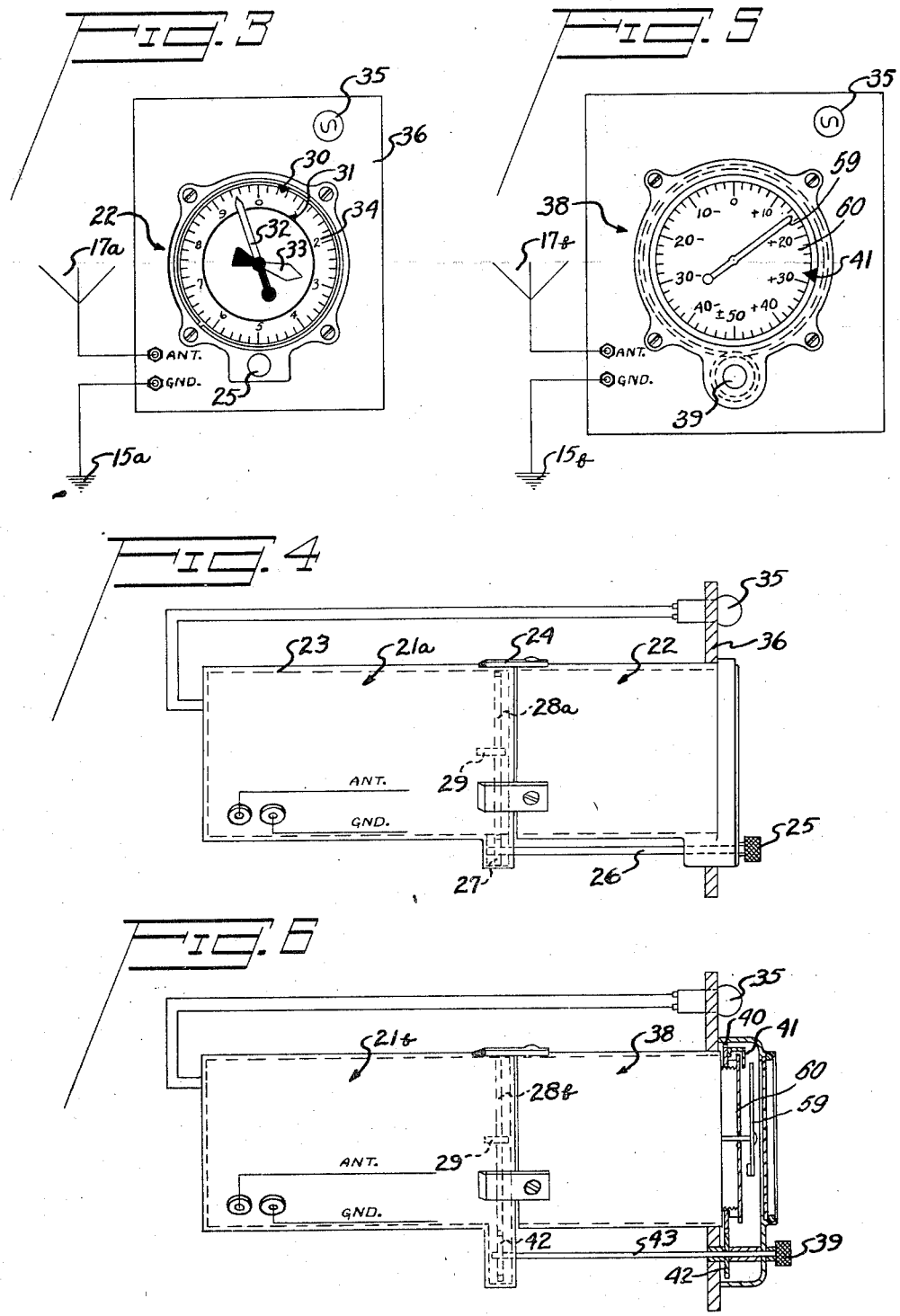

Nov. 3, 1942.          F. G. NESBITT           2,300,432
ALTIMETER CONTROL DEVICE
Filed Aug. 15, 1938         4 Sheets-Sheet 3
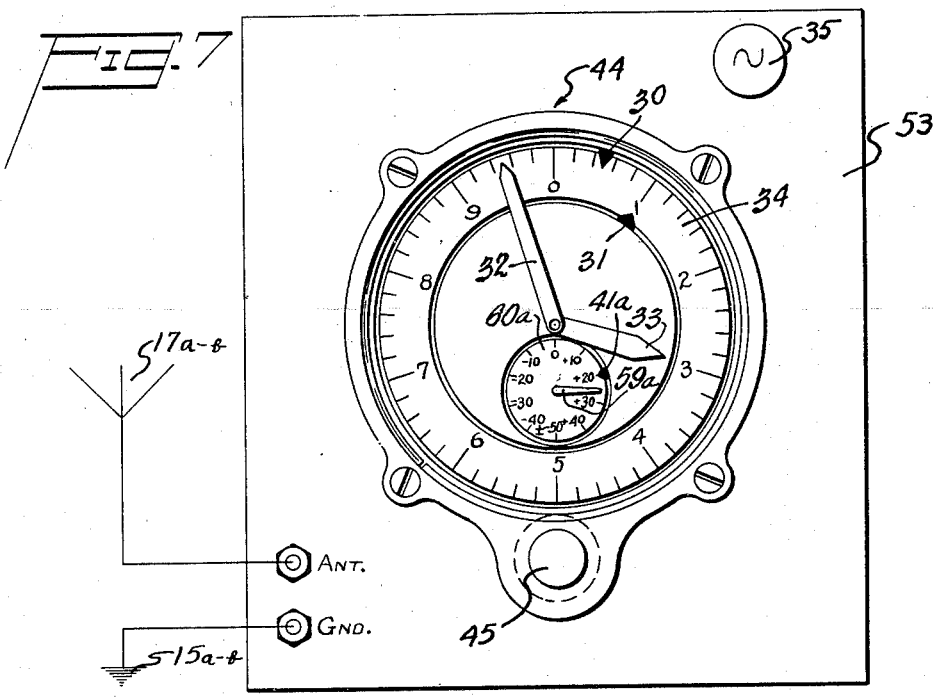
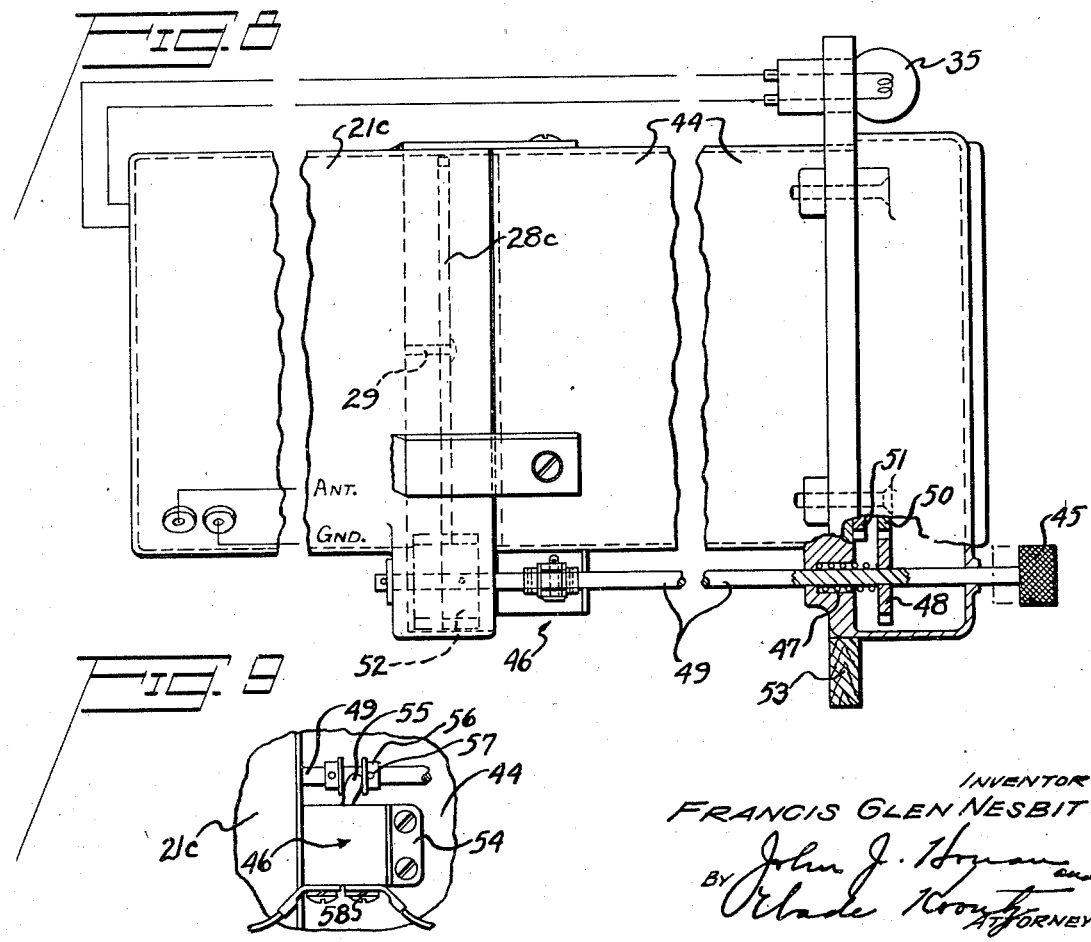
INVENTOR
FRANCIS GLEN NESBITT Nov. 3, 1942.　　　　F. G. NESBITT　　　　2,300,432
ALTIMETER CONTROL DEVICE
Filed Aug. 15, 1938　　　4 Sheets-Sheet 4

INVENTOR
FRANCIS G. NESBITT
BY John J. Horan and Wade Koontz
ATTORNEYS

Patented Nov. 3, 1942

2,300,432

UNITED STATES PATENT OFFICE 2,300,432

ALTIMETER CONTROL DEVICE

Francis Glen Nesbitt, Dayton, Ohio

Application August 15, 1938, Serial No. 224,969

10 Claims. (Cl. 73—4)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates broadly to means for determining altitude, and more particularly for determining the altitude of aerial bodies.

More specifically, the invention relates to altimeters for aircraft and correlated ground equipment. It proposes an apparatus of this class which will give an accurate indication of the height of the craft above the ground or terrain over which the craft is moving, or its height above sea level.

It is an object of my invention to provide a means to further increase the usefulness, dependability, and accuracy of pressure altimeters and temperature-pressure altimeters. Pressure altimeters actually determine their indication by measuring the difference in barometric pressure at the point of measurement and at the point of reference. Present day altimeters permit the point of reference to be changed in flight provided data may be obtained from the ground by radio. To obtain this data with the present day equipment requires an attendant at each point of reference.

It is a further object of my invention to provide a device which includes ground equipment adapted to automatically provide the reference data to airplane equipment by radio without requiring an attendant at each ground station. My invention therefore permits the installation of ground reference equipment at numerous intermediate points including dangerous mountain ranges, critical points, as well as at main control stations, without the need for an attendant. By doing this, the personal errors of the operators are eliminated and greater accuracy is thereby obtained, and conditions which otherwise might be a definite hazard to flying are also eliminated.

Another object of my invention is to provide means for determination of altitude with sufficient accuracy to permit airmen to make blind landings with the aid of automatic ground equipment with which the altimeter is coordinated.

The present invention is based upon the principle of the conventional pressure altimeter (or temperature-pressure altimeter) in combination with an electrical system and radio method whereby the altimeter carried by the aircraft may be coordinated manually by the airman with automatic equipment on a landing field or any other point of reference, which makes it possible to correct the setting of the altimeter for fluctuations of atmospheric pressure and temperature at different times and/or different points of reference. Thus, in substituting automatic electrical methods for transmitting by radio the pressure and temperature indications at the ground point of reference, refinements in apparatus and operating technique are possible.

Other objects and advantages of my invention will become apparent from the following description taken in connection with the accompanying drawings, it being clearly understood that the same are by way of illustration and example only and are not to be construed as in any way limiting the spirit or scope of my invention. The spirit and scope of the invention is to be limited only by the terms of the appended claims.

Referring to the drawings, in which numerals of like character designate similar parts throughout the several claims:

Fig. 1 shows a ground unit for controlling frequency-pressure altitude relation;

Fig. 2 shows a ground unit for controlling frequency-temperature relation;

Fig. 3 shows the front face of an aircraft altimeter responsive to signals of the ground unit of Fig. 1;

Fig. 4 shows a side elevation of Fig. 3;

Fig 5 shows the front face of an aircraft air thermometer unit responsive to signals of the ground unit of Fig. 2;

Fig. 6 shows a side elevation of Fig. 5, partially in cross-section;

Fig. 7 shows the front face of an aircraft temperature-pressure altimeter unit capable of joint response to signals of the ground units of Figs. 1 and 2;

Fig. 8 shows a side elevation in partial cross-section of Fig. 7;

Fig. 9 is a fractional bottom view of the switch shown in Fig. 8.

Figures 10, 11:
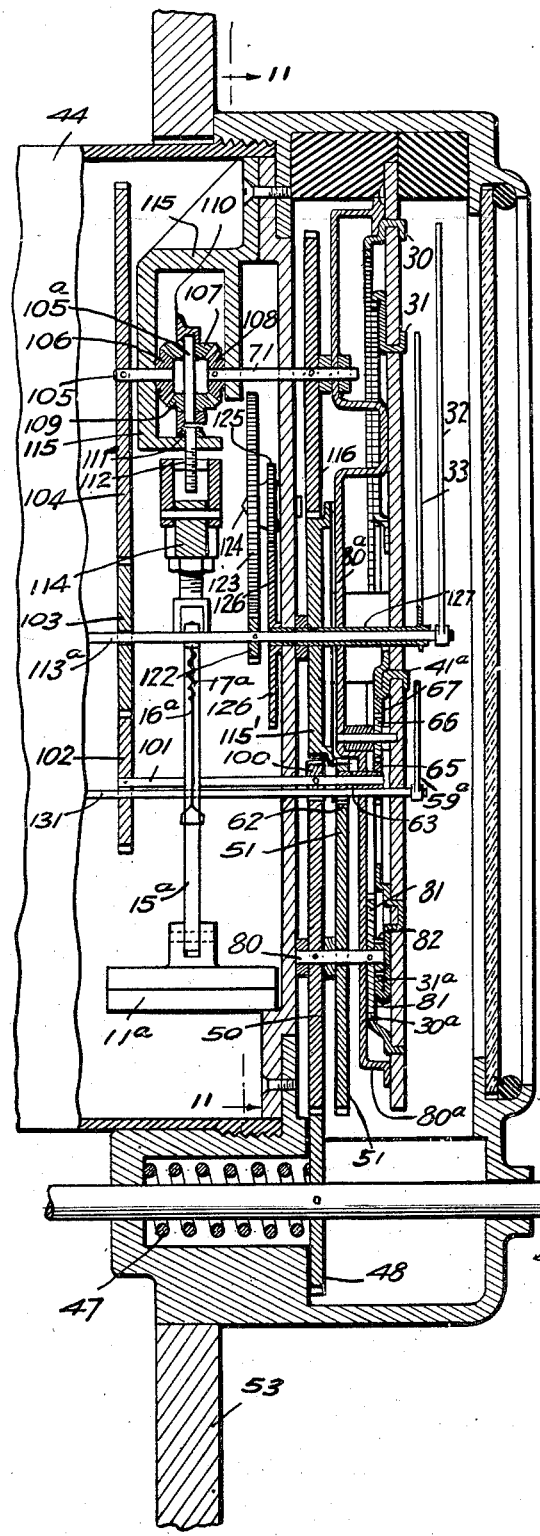
Fig. 10 is a cross-sectional view through the instrument illustrated in Fig. 7.
Fig. 11 is a part elevational view taken generally along the lines 11—11 of Fig. 10.

Fig. 1 shows, in schematic form, a ground unit for controlling the frequency in accordance with a pre-selected frequency-pressure altitude relationship. I make use of a small radio transmitter 1a, the frequency of whose signal is controlled by a pressure responsive means 2 in accordance with the aforesaid pre-selected frequency-pressure relationship. The pressure responsive means 2 is composed of a base 3 fixed to the lower extremity of a pressure responsive element 4, a horizontal link 5 pivoted at its left extremity to an upstanding support 6 and further pivoted inboard thereof to the upper extremity of the pressure element 4 and at its right-hand extremity pivotally connected to a vertical link 7. Thus, expansion of the element 4 causes counterclockwise rotation of the horizontal link 5 about a pivot 8, while contraction thereof causes clockwise rotation of the horizontal link 5. Corresponding rise and fall of the vertical link 7 is utilized to cause clockwise and counter-clockwise rotation, respectively, of a gear sector 9 pivotally secured at 10 to an upstanding support 11 of the base 3. To eliminate backlash in the linkage, the gear sector 9 is provided with a counterbalanced spring 12. Thus, expansion or contraction of the element 4, in response to pressure changes in the atmosphere surrounding the same, brings about counter-clockwise or clockwise rotation of a gear 13 fixedly secured on the shaft forming an integral part of the frequency control of the radio transmitter 1a. The transmitter is provided with a terminal 14 grounded at 15a, and with a terminal 16 operably connected to an antenna 17a. I have thus provided for continued transmission of a suitable radio signal automatically controlled within a pre-designated frequency band and in accordance with a pre-selected frequency-pressure altitude relation by pressure variations acting upon the element 4.

In Fig. 2, the greater portion of the parts of Fig. 1 are duplicated. It should be noted, however, that the pressure responsive means 2 is replaced by a free air thermometer means 18, consisting of an element 4', an exterior bulb 19 and connecting tubing 20, and that the former transmitter 1a, the ground 15a and the antenna 17a are redesignated "1b", "15b" and "17b", respectively. Temperature increase causes counter-clockwise rotation of the horizontal link 5 about the pivot 8, with corresponding counter-clockwise rotation of the gear 13. Temperature decrease effects opposite rotation of the gear 13. I have thus provided for continued transmission of a suitable radio signal automatically controlled within a pre-designated frequency band and in accordance with a pre-selected frequency-temperature relation by temperature variations at the exterior bulb 19 acting upon the element 4'. It should be noted that the frequency band for the radio transmitter 1b (of Fig. 2) must be different than the frequency band for the radio transmitter 1a (of Fig. 1) in order that corrections for pressure and temperature variations be segregated.

Fig. 3 shows the front or indicating dial, and Fig. 4 a side elevation of a standard aircraft pressure altimeter unit revised in accordance with the teaching of my invention to respond to the radio signal of the ground unit of Fig. 1. It is composed of a radio receiver unit 21a and a conventional pressure altimeter 22 mounted in tandem relationship therewith. The receiver 21a is entirely encased within a housing 23 provided at its forward extremity with three mounting lugs 24 by means of which the assembled parts are held in fixed relationship with the rear extremity of the altimeter 22. The short shaft normally provided for the setting knob (such as the setting knob 25 of Figs. 3 and 4) is replaced (in the aforesaid figures) by an elongated shaft 26, extending to and entering within the forward portion of the housing 23, where it is provided with a fixed driving gear 27. The gear 27 remaining at all times in fixed engagement with a second driven gear 28a fixed to a tuning shaft 29 of the receiver 21a. The driving gear 27 and driven gear 28a are so interrelated that the complete range of altimeter "zero setting" adjustment effected by means of the knob 25 lies well within the tuning range accomplished by means of movement of the tuning shaft 29. Thus, at any time an airman desires to effect the correct altimeter reference setting of the aircraft held altimeter to correspond to the cooperating station altimeter located upon the ground or other reference, he has but to adjust the knob 25 backward or forward (depending upon initial temporary setting) over an unknown range of altimeter setting until the ground transmitter 1a and the aircraft held receiver 21a are tuned into identical frequency of radio signal as indicated by means of a signal lamp 35. When a lamp 35 lights, the "zero setting" system of the aircraft altimeter is automatically set to the existing conditions at the station equipment located at the point of ground reference.

Referring to Fig. 3, a brief statement of the manner in which the "zero setting" is accomplished in the conventional altimeter 22 is believed desirable. Altitude is read off a scale 34 in a manner similar to that used in reading a water or gas meter. A pointer 33 constituting the "thousand foot" pointer, is shown closely approaching the numeral 3 on the scale 34. This indicates the altitude as closely approximating, though slightly less than 3000 feet. A "hundred foot" pointer 32 is shown half way between the numerals 9 and 0, which indicates an actual reading of 950 feet. The combined indication of both pointers is therefore taken to "read" 2950 feet altitude.

Reference marks 30 and 31, in conjunction with the setting knob 25, constitute a "zero setting" system well known to those skilled in the art of instrument flying. Both marks are "read" on the fixed scale 34 and in a manner identical to "reading" of the pointers 32 and 33. The setting knob 25, when turned manually, rotates the pointers 32 and 33 and the reference marks 30 and 31, simultaneously. During the aforesaid rotation, the pointer 32 and the reference mark 30 are rotated the same amount with reference the scale 34, but in the opposite direction. The same thing is true of the other pointer and reference mark, that is, when the "thousand foot" pointer 33 is rotated up 1000 feet, the "thousand foot" reference mark 31 is rotated down 1000 feet. In like manner, when the "hundred foot" pointer 32 is rotated up 100 feet, the "hundred foot" reference mark 30 is rotated down 100 feet. When both reference marks read "zero," the pointers are reading altitude in the standard atmosphere above "standard atmosphere sea level." In this way, the "zero setting" system always indicates the altitude in the "standard atmosphere" at which the pointers will read "zero." As has been previously stated, the receiver 21a has its tuning control geared directly with the altimeter setting knob 25 such that the correct "zero setting" will be effected when the signal from the ground transmitter 1a is tuned in as indicated by means of the lamp 35 provided on the forward face of an altimeter mounting panel 36.

If it be assumed that the standard temperature conditions, as defined by the "standard atmosphere," actually exist throughout the atmosphere; true altitude will be indicated by the pressure altimeter when the "zero setting" has been effected, as described above. It is well known to those skilled in the art, however, that such a condition would be a great rarity, and for that reason and to further obtain maximum accuracy it is absolutely essential that the indication of the pressure altimeter be corrected for the existing ground temperature and the existing temperature aloft. This correction is usually made by the use of computers or by referring to reference tables. The temperature aloft is obtained by a free-air thermometer installed on the airplane but the ground temperature at the ground point of reference must be obtained by radio.

Fig. 5 shows the front face and Fig. 6 the side elevation of a standard aircraft free air thermometer unit to which has been added an independently operable reference mark adapted to respond to radio signals of the ground unit of Fig. 2. It consists of a conventional free air thermometer 38 provided with a ground temperature setting knob 39 forming a part of a system much the same in its mechanical operation as the "zero setting" system heretofore described in connection with the altimeter 22, except that it is not connected to the pointer 59. An aircraft held receiver 21b, similar in its internal structure to the internal structure of the aircraft held receiver 21a, but differing therefrom in its frequency band, is positioned with its longitudinal axis coaxial with the longitudinal axis of the thermometer 38. In the partial cross-sectional showing of Fig. 6, a gear ring 40, supporting a reference mark 41 in rotational relation to a fixed thermometer scale 60, is shown in operative engagement with a driving gear 42 fixed to the shaft 43 of the setting knob 39. A second driving gear 42 is in operable engagement with a driven gear 28b, performing in substance the identical functions of the driven gear 28a of Fig. 4. The second gear 42 and driven gear 28b are also so interrelated that the ground temperature range of the thermometer scale over which the ground temperature reference mark 41 is moved by means of the knob 39 will lie well within the tuning range accomplished by means of movement of the tuning shaft 29. Thus, at any time an airman desires to obtain the existing ground temperature he has but to adjust the knob 39 backward or forward (depending upon initial temporary setting) until the ground transmitter 1b and the aircraft held receiver 21b are tuned into identical frequency of radio signal as indicated by means of the signal lamp 35. When this is accomplished, the ground temperature may be readily ascertained by simply noting the position of the reference mark 41 with respect to the temperature scale 60.

A temperature-pressure altimeter is one which derives its indication from both temperature and pressure and with this type of altimeter the above described temperature correction is unnecessary. However, in using a temperature-pressure altimeter of the type disclosed in my Patent No. 2,081,950, it is necessary to obtain both the ground temperature and ground pressure before setting the "zero setting" system. My invention may also be applied to this type of altimeter. Fig. 7 shows the front face, and Fig. 8 shows a partial side elevation, of an aircraft temperature-pressure altimeter capable of joint response to signals from the ground units of both Figs. 1 and 2. The separate altimeter 22 of Figs. 3 and 4 and the thermometer 38 of Figs. 5 and 6 are replaced by a single temperature-pressure altimeter 44. An adjusting knob 45 is provided for alternate "zero setting" of either the "ground pressure" unit or the "ground temperature" unit of the altimeter 44. In like manner the separate radio receiver unit 21a (of Fig. 4) and the separate radio receiver unit 21b (of Fig. 6) are combined into a single radio receiver unit 21c. A toggle switch 46, automatically operated by normal (full) or inward (dot-dash), positionings of the knob 45 of Fig. 8, is utilized to selectively "tune in" the aforesaid "ground pressure" unit or "ground temperature" unit of the radio receiver unit 21c with corresponding alternate "zero setting" of the "ground pressure" unit or the "ground temperature" unit of the altimeter 44. It will be noted, in Fig. 8, that a spring 47 normally holds a driving gear 48, fixed to a shaft extension 49 of the knob 45, in operable engagement with a driven gear 50. The gear 50 is the outermost element of a gearing system by means of which "zero setting" adjustment of the "pressure element" of the temperature-pressure altimeter 44 referred to above is obtained; i. e., adjustment of the reference marks 30 and 31 in relation to the fixed scale 34. It will be further noted that the knob 45 can be inwardly pressed into the "dot-dash" positioning of Fig. 8, such that the driving gear 48 is brought into operable engagement with a gear 51 forming the outermost element of a gearing system by means of which "zero setting" adjustment of the "temperature element" of the temperature-pressure altimeter 44 referred to above is obtained, i. e., adjustment of the reference mark 41a in relation to a fixed scale 60a. By further provision of a second driving gear 52, fixed to the shaft extension 49 and at all times in operable engagement with a driven gear 28c of radio receiver 21c, it is readily obvious that the airman can effect "zero setting" for "pressure" or for "temperature" by sole reference to the signal lamp 35 provided upon a mounting panel 53 of the temperature-pressure altimeter 44. At this point I desire to call special attention to the fact that either temperature change (effecting movement of the pointer 59c) or manual shifting of the reference mark 41a (by the setting knob 45) directly effects a change in the positioning (i. e., a temperature compensation) of the pointers 32 and 33 of Fig. 7.

In the instrument illustrated in Figure 7, and as previously described, compensation is made for ground pressure by actuation of knob 45 which, in turn, operates shaft 49 for tuning the receiver and simultaneously adjusting the movable pressure reference marks 30 and 31 by means of a series of gears as illustrated in Fig. 10, and which will now be described. Referring to that figure, gear 48 is fixedly attached to shaft 49 as previously pointed out. This gear 48, in turn, is adapted to selectively mesh with gears 50 and 51. Actuation of knob 45 when gears 48 and 50 are in mesh results in the adjustment of the reference marks 30 and 31 as well as pointers 32 and 33. The gear arrangement for accomplishing actuation of reference marks 30 and 31 will be described first as follows:

Gear 50 is fixedly attached to shaft 80 which, in turn, passes through and has bearing engagement with frame member 80a. Also fixedly attached to shaft 80 at one end thereof are a pair of planetary gears 81 and 82 which have a ratio relationship of 1 to 10. Gear 82 meshes with internal gear 31a for operating the same, and consequently reference mark 31 which is integral therewith. Gear 81 meshes with internal gear 30a for operating the same, and reference mark 30 which is integral therewith. Actuation of knob 45 to adjust pointers 32 and 33 is accomplished by intermeshing gears 48, 50 and 100, the latter of which is rigidly attached to one end of shaft 101. At the other end of this shaft is a gear 102 adapted to mesh with gear 103 freely rotatably mounted on pointer shaft 113a. Gear 103 is adapted to mesh with gear 104 fixedly attached to shaft 105 which, in turn, has suitable bearing engagement in frame member 115. Also attached to shaft 105 is a gear 106 adapted to mesh with a pair of gears 107 and 109, these two latter gears having bearing engagement on a pin or shaft 105a. Also in meshing engagement with gears 107 and 109 is a gear 108 rigidly attached to one end of shaft 71, which in turn is suitably supported in bearing engagement with frame member 115. Rigidly attached to a shaft 105a is a ring gear 110, this ring gear and gears 106, 107, 108 and 109 forming a differential gear system. Ring gear 110 is adapted to mesh with a gear 111 rigid with screwthreaded shaft 112 which, in turn, is supported by frame 115. Shaft 122 is adapted to adjustably support link 114. Operation of link 114 results in a corresponding operation of pointers 32 and 33. The link and the pointer shaft 113a are connected by a mechanism more particularly shown in Figure 1 of my aforementioned prior patent. Since my aforementioned prior patent shows but a single pointer, it is necessary that pointers 32 and 33 be operatively connected by suitable gear mechanism, this gear mechanism being shown in Figure 10 and comprising a gear 122 integral with shaft 113a. Gear 122 is adapted to mesh with gear 123 rigid with shaft 124 which, in turn, is suitably mounted for bearing engagement in the instrument. Integral with shaft 124 is a gear 125 adapted to mesh with gear 126 which in turn is integral with hollow shaft 127. Pointers 32 and 33 are also actuated by means of pressure responsive element 11a, metallic link 15a, secondary link 16a, flexible chain connection 17a corresponding to identical parts in my aforementioned patent but identified therein without the suffix a.

Coming now to the temperature compensating feature of the invention, pointers 32 and 33 are adapted to be compensated for ground temperature as well as the temperature existing at the instrument. The parts are so interconnected that actuation of the knob to tune in the ground temperature receiver results in a simultaneous actuation of pointers 32 and 33 as well as temperature reference mark 41a. This result is accomplished by actuation of knob 45 with gears 48 and 51 in mesh. Gear 51 is adapted to mesh with the peripheral teeth of gear 62, the edge teeth of which mesh with the edge teeth of gear 115'. Gear 115', in turn, has teeth on the periphery thereof meshing with the peripheral teeth of gear 116, integral with shaft 71. As previously pointed out, shaft 71 has also integral therewith gear 108 forming a part of the previously described differential.

Coming now to the actuation of temperature reference mark 41a, upon actuation of knob 45 it will be noted that gear 62 is integral with one end of hollow shaft 63 freely rotatable on shaft 101 and having suitable bearing engagement with frame member 80a. The other end of shaft 63 has integral therewith a gear 65 adapted to mesh with gear 66 suitably supported in the instrument which, in turn, is in meshing engagement with internal gear 67 carrying reference mark 41a. It will thus be readily apparent that actuation of knob 45 results in the corresponding actuation of temperature reference mark 41a.

Pointers 32 and 33 are actuated by a suitable mechanism in response to temperature changes at the instrument, to follow the teaching of my aforementioned prior patent, by a free air thermometer 34a, flexible connection 33a and Bourdon tube 30', which is connected to link 114 by connection 28' and pin 29a. Operation of the Bourdon tube results in the corresponding operation of the link 114 which, in turn, operates pointers 32 and 33 as previously described and particularly pointed out in my aforementioned prior patent. In order to actuate the pointer 59a to give an indication of temperature change, there is connected to Bourdon tube 30' by means of link 128 a rack 129 adapted to mesh with gear 130, integral with shaft 131. Shaft 131, as will be noted, carries pointer 59a.

The toggle switch 46 consists of a body portion 54 detachably screwed to the altimeter 44, a yoked throw 55, two throw collars 56 and attaching pins 57, fixed to the shaft extension 49 and binding posts 58. Operation thereof has been previously described above.

My invention permits the following simple operations to be accomplished by an airman in setting his pressure altimeter in flight. Referring to Fig. 3 the airman rotates knob 25 slightly either way until the signal lamp 35 lights. The setting is automatically made to conform to the existing conditions on the ground. Should the airman require the maximum accuracy, the indication may be corrected by the use of any suitable computer. To use the computer, the temperature aloft and the temperature at the ground is required. He reads the temperature aloft from the pointer of the thermometer 38 shown in Fig. 5. To get the temperature at the ground, he rotates knob 39, Fig. 5 until the signal lamp 35 lights. He then reads the ground temperature on the temperature scale adjacent to the reference mark 41.

In using a temperature-pressure altimeter with my invention, the above noted operations are greatly simplified. Knob 45 is pushed in and rotated until the signal lamp 35 lights, thus indicating that "zero setting" of pointers 32 and 33 has been accomplished for "temperature". The knob 45 is then permitted to come out by the pressure of the spring 47. The signal lamp 35 will thereafter go out. The knob is again rotated until signal lamp 35 lights, thus indicating that additional "zero setting" of pointers 32 and 33 has been accomplished for "pressure". Complete "zero setting" is then accomplished and true altitude will be indicated.

Although the description is specific to the illustrations, it is to be understood that there may be departures therefrom which will still be within the field and scope of the invention, so that I do not wish to be restricted thereto, but only in so far as the appended claims are so limited.

Having thus described my invention, what I claim as new and desire to secure by Letters Patent of the United States is:

1. An apparatus for determining the altitude of an aerial body above a given reference level comprising, means located at said reference level for generating radio frequency oscillations in accordance with predetermined characteristics of the atmosphere, means carried by said aerial body for tuning said oscillations, further carried means for indicating like predetermined characteristics of the atmosphere including zero setting adjustment, and connecting means between said tuning means and zero setting adjustment whereby tuning of said receiver effects zero setting adjustment.

2. An apparatus for determining the altitude of an aerial body above a given reference level comprising, means located at said reference level for generating radio frequency oscillations in accordance with predetermined characteristics of the atmosphere, manually adjusted means carried by said aerial body for tuning said oscillations, further carried means for indicating like predetermined characteristics of the atmosphere including zero setting adjustment, and connecting means between said tuning means and zero setting adjustment whereby tuning of said receiver automatically effects zero setting adjustment.

3. An apparatus for determining the altitude of an aerial body above a given reference level comprising, radio transmission means located at said reference level self-adjusting in accordance with changes in predetermined atmospheric characteristics, means carried by said aerial body for indicating change in like atmospheric characteristics including zero setting adjustment, and further carried means referable to said radio transmission means and interconnected with said zero setting adjustments such that bringing of said further carried means into tuned relationship with said radio transmission means automatically effects zero setting of said change indicating means.

4. An apparatus for determining the altitude of an aerial body above a given reference level comprising, radio transmission means located at said reference level self-adjusting in accordance with both pressure and temperature changes, means carried by said aerial body for indicating change in atmospheric pressure and temperature including zero setting adjustments, and further carried means referable to said radio transmission means and selectively interconnectable with said zero setting adjustments such that bringing of said further carried means into tuned relationship with said radio transmission means automatically effects zero pressure and temperature setting.

5. A system for determining the true altitude of an aerial body above a given reference level comprising: a transmitter located at said reference level, constituting means for generating a carrier wave at a predetermined radio frequency; means for varying the carrier frequency in accordance with an atmospheric condition external to said transmitter; means carried by said aerial body for indicating like atmospheric condition to that external to said transmitter, including zero setting adjustment; and further means carried by said aerial body in remote radio communication with said transmitter and interconnected to said zero setting adjustment such that tuning of said further carried means to said carrier frequency effects zero setting adjustment.

6. A system for determining the true altitude of an aerial body above a given reference level comprising: a transmitter located at said reference level, constituting means for generating a carrier wave at a predetermined radio frequency; means for varying the carrier frequency in accordance with an atmospheric condition external to said transmitter; a second like transmitter similarly located; further means varying said second carrier frequency in accordance with a second atmospheric condition external to said second transmitter; means carried by said aerial body for indicating like atmospheric conditions to those external to said first and second transmitters, including zero setting adjustment, and further means carried by said aerial body capable of remote radio communication with first one then the other of said transmitters and being substantially continuously interconnected with first one then the other of said zero setting adjustments such that alternate tuning of said further carried means to first one then the other of said carrier frequencies effects alternate zero setting adjustment.

7. An apparatus for determining the altitude of an aerial body with reference to a given level, comprising: a radio signal transmitter located at said reference level, atmospheric-pressure-responsive means for varying the frequency of the transmitted signal in accordance with a predetermined pressure-frequency relation, receiver means carried by said aerial body tunable to receive and detect the transmitted radio signal, a pressure indicator calibrated to read altitude and having a zero setting means, and means operatively associated with said receiver and said zero setting means for tuning said receiver to the transmitted signal and adjust said zero setting in accordance with a predetermined pressure-frequency relation corresponding to the pressure-frequency relation of the ground transmitter.

8. An apparatus for determining the altitude of an aerial body with reference to a given level, comprising radio signal transmission means for transmitting signals having frequencies, respectively, as a function of the pressure and temperature of the atmosphere at said reference level, a radio receiving means tunable within a frequency band including the preselected frequency range of said transmitting means, a pressure indicator calibrated to read altitude and having a zero pressure setting means and a zero temperature setting means, said setting means being respectively associated with said receiving means for establishing pressure and temperature settings upon tuning of said receiver to the transmitted signals in accordance with predetermined pressure-frequency and temperature-frequency relations corresponding to the pressure-frequency and temperature-frequency relations of the transmission means.

9. In an apparatus for determining the altitude of an aerial body with reference to a given level, in combination, a pressure altimeter including zero setting adjustment for pressure, a radio receiver having its frequency band based upon a preselected frequency range, means for transmitting at frequencies within said range and at a frequency which varies in response to variations in atmospheric pressure conditions at said level, means for tuning said receiver to such frequency, and means correlating said tuning means and said adjustment for effecting zero setting adjustment of said altimeter when said receiver is tuned to a frequency corresponding to the pressure condition of the atmosphere at the reference level.

10. In an apparatus for determining the altitude of an aerial body with reference to a given level, in combination, a pressure-temperature altimeter including selective zero setting adjustments for pressure and temperature, radio receiver means having a frequency band based upon a preselected frequency range, means for transmitting at frequencies within said range and at frequencies which vary in response to changes in temperature and pressure conditions of the atmosphere at said level, means for selectively tuning said receiver means to such frequencies, and means correlating said tuning means and said selective adjustments for effecting zero setting adjustment of said altimeter when said receiver is tuned to a frequency corresponding to either the pressure or the temperature condition of the atmosphere at the reference level.

FRANCIS GLEN NESBITT.